United States Patent
Yatsushiro et al.

(10) Patent No.: US 7,870,935 B2
(45) Date of Patent: Jan. 18, 2011

(54) TRACTION DRIVE POWER TRANSMISSION DEVICE

(75) Inventors: Daisuke Yatsushiro, Shinagawa-ku (JP); Takeki Shirai, Shinagawa-ku (JP); Hidekazu Michioka, Shinagawa-ku (JP); Takahiro Kawaguchi, Shinagawa-ku (JP); Haruo Kusakabe, Utsunomiya (JP); Mitsuru Fukuda, Utsunomiya (JP); Seiichi Otsubo, Utsunomiya (JP)

(73) Assignees: THK Co., Ltd., Tokyo (JP); Mitutoyo Corporation, Kawasaki-shi (JP)

(*) Notice: Subject to any disclaimer, the term of this patent is extended or adjusted under 35 U.S.C. 154(b) by 957 days.

(21) Appl. No.: 10/539,479

(22) PCT Filed: Dec. 26, 2003

(86) PCT No.: PCT/JP03/16872
§ 371 (c)(1),
(2), (4) Date: Jan. 23, 2006

(87) PCT Pub. No.: WO2004/061334
PCT Pub. Date: Jul. 22, 2004

(65) Prior Publication Data
US 2006/0194668 A1      Aug. 31, 2006

(30) Foreign Application Priority Data
Dec. 27, 2002    (JP)    ............... 2002-380751

(51) Int. Cl.
*F16N 25/00*    (2006.01)
(52) U.S. Cl. .................... 184/9; 384/15; 74/89.44; 74/424.88
(58) Field of Classification Search ................ 184/9; 384/13; 74/424.88
See application file for complete search history.

(56) References Cited

U.S. PATENT DOCUMENTS 6,155,717 A * 12/2000 Michioka et al. .............. 384/15

(Continued)

FOREIGN PATENT DOCUMENTS

JP           62-27252       2/1987

(Continued)

OTHER PUBLICATIONS

Japanese Office Action dated Jan. 20, 2009; Application No. 2002-380751.

(Continued)

*Primary Examiner*—Robert A Siconolfi
*Assistant Examiner*—James K Hsiao
(74) *Attorney, Agent, or Firm*—Westerman, Hattori, Daniels & Adrian, LLP

(57) ABSTRACT

A traction drive power transmission device, where a lubrication oil can be stably and continuously applied for a long period to portions at which rollers and a shaft are in contact with each other, shortage of the lubrication oil does not occur at the contact portions, the lubrication oil is not wasted, and which does not impair work environment by contaminating floor surface etc. A traction drive power transmission device has at least one drive roller (12a), a follower roller (12b), and a circular cylinder-like shaft (11). The shaft (11) is held between the drive roller (12a) and the follower roller (12b). When the drive roller (12a) is rotated, rotational force by the rotation is transmitted to the shaft (11) to drive it in its axial direction. The device has a lubrication oil-delivering portion (20) with application bodies (22-1, 22-2) for applying a lubrication oil only to portions where the shaft (11) is in contact with the drive roller (12a) and the follower roller (12b).

4 Claims, 7 Drawing Sheets

U.S. PATENT DOCUMENTS 6,401,867 B1 * 6/2002 Michioka et al. ............... 184/5
7,437,831 B2 * 10/2008 Hayashi et al. ............... 33/706

FOREIGN PATENT DOCUMENTS

| JP | 3-28350 U | 3/1991 |
| JP | 04-046216 A | 2/1992 |
| JP | 06-307442 A | 11/1994 |
| JP | 7-181275 | 7/1995 |
| JP | 10-184683 A | 7/1998 |
| JP | 2000-97234 A | 4/2000 |

OTHER PUBLICATIONS

Japanese Office Action dated Sep. 8, 2009, issued in corresponding Japanese patent application No. 2002-380751.

* cited by examiner

TRACTION DRIVE POWER TRANSMISSION DEVICE

FIELD OF THE INVENTION

The present invention relates to a traction drive power transmission device for transmitting a driving force of a roller to a shaft so as to drive the shaft in the axial direction, the traction drive power transmission device being provided with a lubricator for supplying lubricant to contact portions of the rollers with the shaft.

BACKGROUND OF THE INVENTION

FIG. 1 is a perspective view showing a schematic structure of a traction drive power transmission device 100 of this kind. The traction drive power transmission device 100 comprises a driving section 103, composed of a driven roller 102a and a driving roller 102b, and a guiding section 104, composed of a pair of driven rollers 102a and 102a, wherein a shaft 101 which is made of metal and is formed in a cylindrical shape is held with high bearing stress between the driven roller 102a and the driving roller 102b of the driving section 103 and between the driven rollers 102a and 102a of the guiding section 104. Each of the driven rollers 102a and the driving roller 102b is made of metal, is formed into a substantially cylindrical shape of which periphery is curved into an arc shape in the axial direction, and is arranged such that its central axis are perpendicular to the axis of the shaft 101.

The traction drive power transmission device 100 acts as follows. As the driving roller 102b is rotated in a state that the shaft 101 is held between the driven roller 102a and the driving roller 102b of the driving section 103, the rotational force is transmitted from the driving roller 102b to the shaft 101 by frictional force generated on contact faces of the driving roller 102b and the shaft 101, whereby the shaft 101 moves in the axial direction. Such traction drive power transmission device 100 has advantages that, as compared to ball screws and the like, the structure is simple so that it is easy to increase the moving speed of the shaft 101 by changing the diameter of the driving roller 102b and/or changing the rotational speed and therefore has been used in a broad range of fields.

In the traction drive power transmission device 100 having the aforementioned structure, a lubricant film is formed on contact portions of the shaft 101 with the driven roller 102a and the driving roller 102b by applying lubricant such as grease or oil on sides of the shaft 101 so as to prevent wear of the driven roller 102a, the driving roller 102b, and the shaft 101. However, the conventional traction drive power transmission device has the following problems:

(1) Since the lubricant is applied on the outer surface of the shaft 101 periodically by hands using a brush or the like, the work operation of applying the lubricant is troublesome.

(2) Since each of the driven roller 102a and the driving roller 102b is formed to have a periphery composed of a single arc or a combination of a plurality of arcs in the axial direction, the contact portions of the peripheries of the driven roller 102a and the driving roller 102b with the periphery of the shaft 101 are only the central portions of the arcs. However, as the lubricant is applied to the periphery of the shaft 101 by hands, the lubricant is applied not only to the contact portions of the shaft 101 with the driven roller 102a and the driving roller 102b but also to other portions than the contact portions. Accordingly, the lubricant is consumed wastefully.

(3) As the lubricant is applied by hand to the periphery of the shaft 101 of which section is circular, the applied lubricant flows downward and drips because the property of retaining the lubricant is poor. Accordingly, there is a problem that the lubricant at the contact portions easily becomes insufficient so that the lubricant must be applied frequently. There is also a problem that the dripped lubricant soils a floor and the like so as to worsen working conditions.

The present invention has been made in view of the aforementioned problems and the object of the present invention is to provide a traction drive power transmission device in which lubricant can be stably applied to contact portions of a shaft with rollers over an extended time period so as to prevent the lubricant from becoming insufficient at the contact portions and to prevent the lubricant from being wastefully consumed so that the working conditions is not worsened by soiling a floor and the like.

SUMMARY OF THE INVENTION

To achieve the aforementioned object, the present invention provides a traction drive power transmission device comprising: at least one driving roller, a driven roller, and a cylindrical shaft, wherein the shaft is held between the driving roller and the driven roller and rotational force of the driving roller is transmitted to the shaft by rotating the driving roller so as to move the shaft in the axial direction, and is characterized in that the traction drive power transmission device is provided with a lubricator having applicators for applying lubricant only to contact portions of the shaft with the driving roller and the driven roller.

Since the lubricator is provided as mentioned above, the lubricant can be applied only to contact portions of the shaft with the driving roller and the driven roller by the applicators so that the lubricant can be effectively used without wasting the lubricant. Since the lubricant is applied only to the contact portions of the shaft with the driving roller and the driven roller, it can nearly completely prevent lubricant from dripping down.

In the traction drive power transmission device, the lubricator comprises a reservoir which absorbs and stores lubricant and supplies the lubricant to the applicators, and a casing which accommodates the applicators and the reservoir.

Since the lubricator comprises the reservoir and the casing accommodating the applicators and the reservoir as mentioned above, the lubricant absorbed and stored in the reservoir is supplied only to the contact portions of the shaft with the driving roller and the driven roller through the applicators. Therefore, it is possible to stably and continuously apply the lubricant over an extended time period.

Further in the traction drive power transmission device, the casing is provided with a concave portion which can be attached to and detached from the shaft in a direction perpendicular to the axial direction thereof and the applicators are disposed such that ends of the applicators project from a face, opposed to the shaft, of the concave portion.

Since the casing of the lubricator is provided with the concave portion which can be attached to and detached from the shaft and the ends of the applicators project from the face, opposed to the shaft, of the concave portion as mentioned above, the ends of the applicators come in contact with the contact portions of the shaft with the driving roller and the driven roller only by fitting the concave portion of the casing of the lubricator, thereby facilitating the positioning.

Furthermore in the traction drive power transmission device, the driving roller and the driven roller are accommodated in a housing box, the shaft penetrates and extends from both ends of the housing box, and the casing of the lubricator is attached to an end face—where the shaft penetrates—of the housing box.

Since the casing of the lubricator is attached to the end face—where the shaft penetrates—of the housing box, the attachment of the lubricator is easily done just by attaching the casing to the end face of the housing box.

Moreover in the traction drive power transmission device, the driving roller is in contact with the shaft at at least two points and the driven roller is in contact with the shaft at at least one point.

BRIEF DESCRIPTION OF THE DRAWINGS

FIGS. 4A, 4B show the lubricator, wherein FIG. 4A is a front view and FIG. 4B is a side view;

BEST MODES FOR CARRYING OUT THE INVENTION

Figure 1:
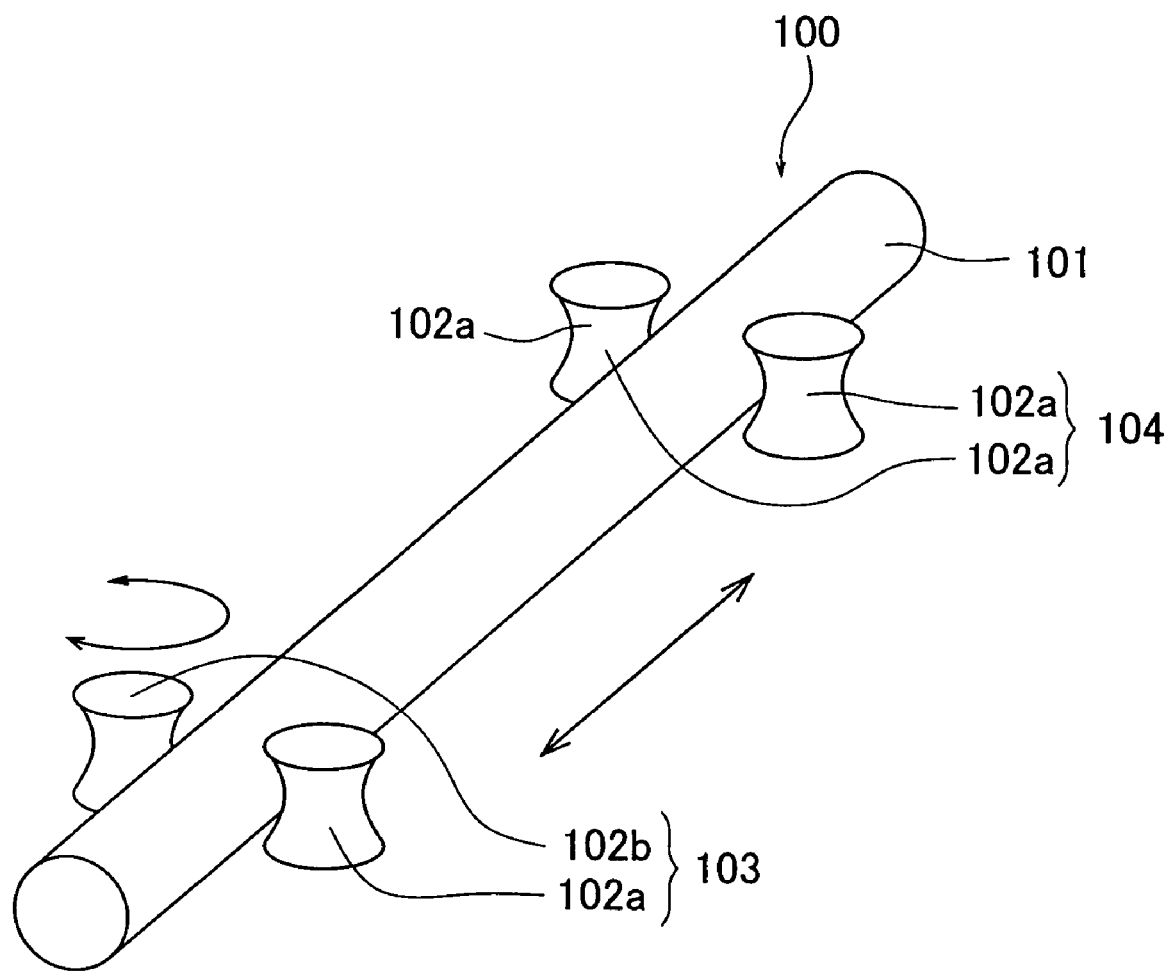
FIG. 1 is a perspective view showing a schematic structural example of a traction drive power transmission device.
Figure 2:
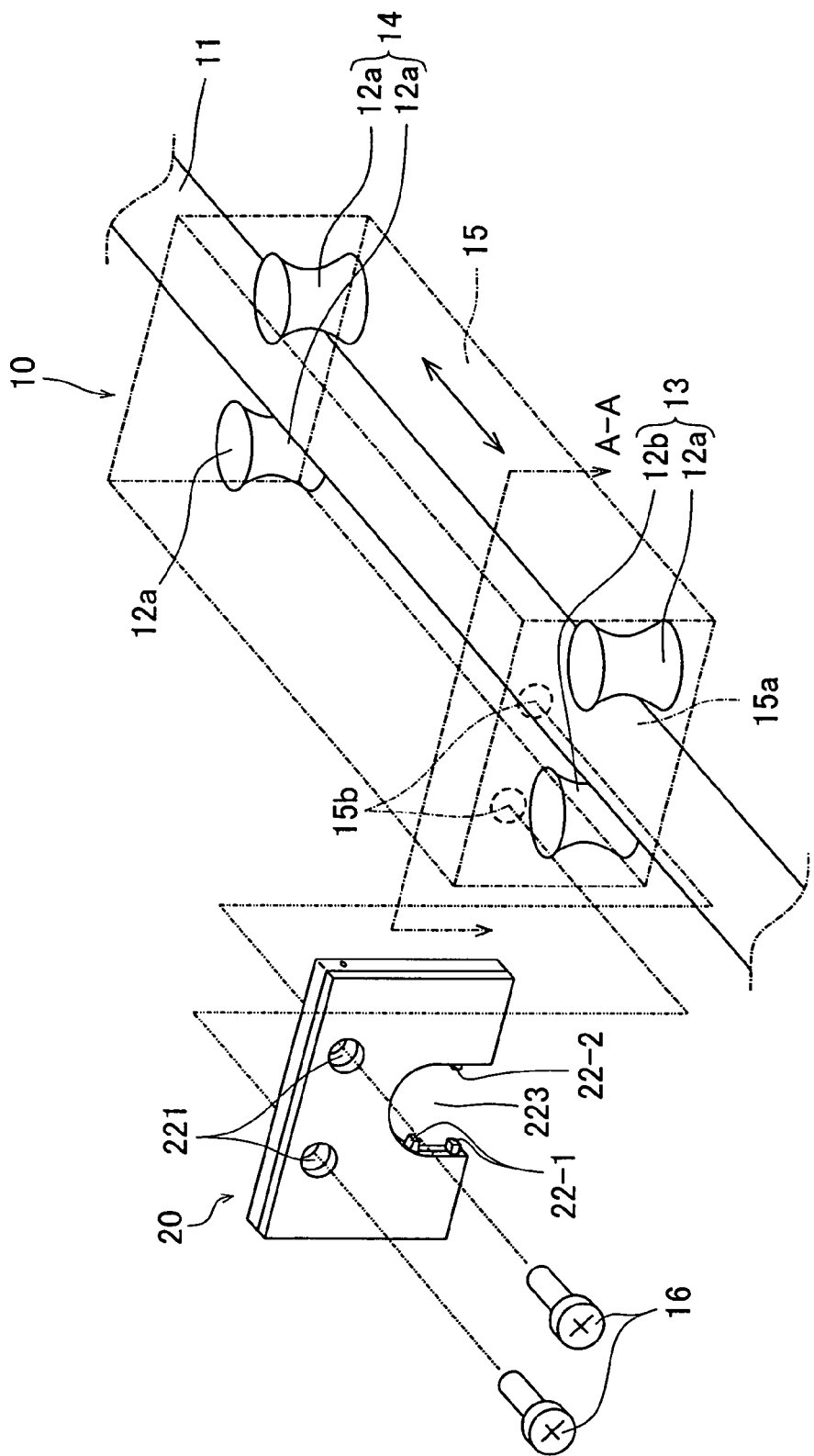
FIG. 2 is an illustration showing a traction drive power transmission device provided with a lubricator according to an embodiment of the present invention.

Hereinafter, embodiments of the present invention will be described with reference to the attached drawings. FIG. 2 is an exploded perspective view showing a structural example of a traction drive power transmission device provided with a lubricator according to the present invention. The traction drive power transmission device 10 comprises a driving section 13, composed of a driven roller 12a and a driving roller 12b, and a guiding section 14, composed of a pair of driven rollers 12a and 12a, wherein a shaft 11 which is made of metal and is formed in a cylindrical shape is held with high bearing stress between the driven roller 12a and the driving roller 12b of the driving section 13 and between the driven rollers 12a and 12a of the guiding section 14.

The driven roller 12a and the driving roller 12b of the driving section 13 and the pair of driven rollers 12a and 12a of the guiding section 14 are housed in a housing box 15. The shaft 11 penetrates and extends from the side faces in the axial direction of the housing box 15. The lubricator 20 having a structure as will be described later is fixed to the end face 15a—where the shaft 11 penetrates—of the housing box 15 by screws 16.

The aforementioned shaft 11 is made of metal and is formed in a cylindrical shape. Each of the driven rollers 12a and the driving roller 12b are made of metal, is formed into a substantially cylindrical shape of which periphery is curved into an arc shape in the axial direction, and is arranged such that its central axis is perpendicular to the axis of the shaft 11. As described above, the shaft 11 is held between the driven roller 12a and the driving roller 12b of the driving section 13 and between the driven rollers 12a and 12a of the guiding section 14.

Figure 3:
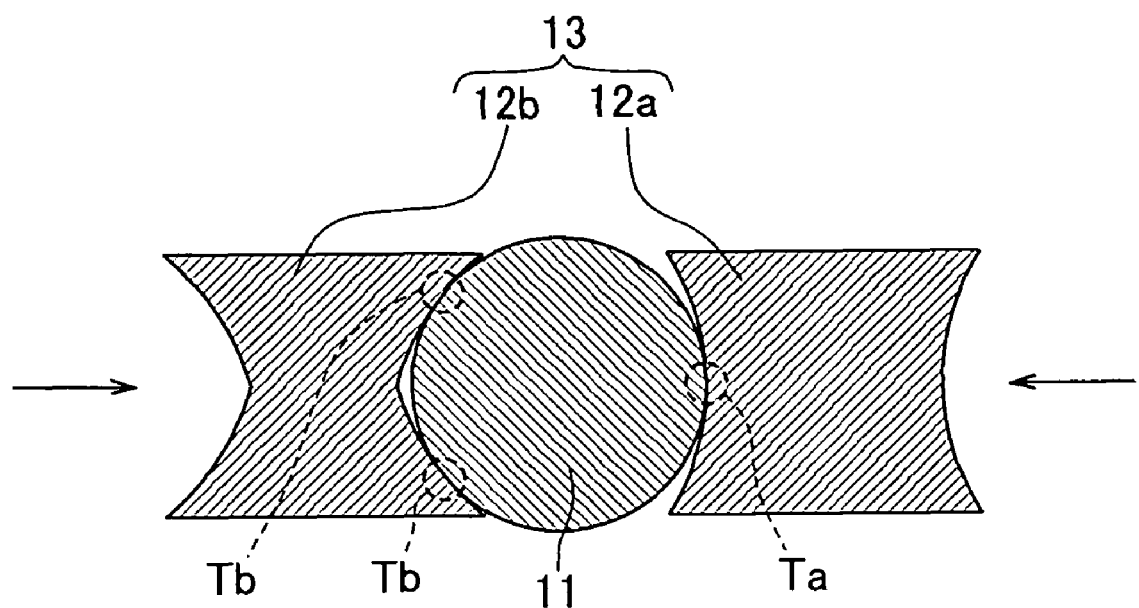
FIG. 3 is a sectional view taken along a line A-A of FIG. 2.

To move the shaft, of which section is circular, by rollers in the axial direction, it is required to make the rollers to be in contact at at least three points with the periphery of the shaft. FIG. 3 is a sectional view taken along a line A-A of FIG. 2 showing the contact state in case that the contact portions of the driven roller 12a and the driving roller 12b of the driving section 13 with the shaft are three point. The periphery of the driven roller 12a is formed in a circular arc shape composed of a single arc so that the periphery of the driven roller 12a is in contact with the periphery of the shaft 11 at a middle point of the arc, i.e. one point. This contact portion is designated by Ta. On the other hand, the periphery of the driving roller 12b is formed in a gothic arc shape composed of a plurality of arcs (two in FIG. 3) so that the periphery of the driving roller 12b is in contact with the periphery of the shaft 11 at respective middle points of the arcs, that is, the contact portions are a plurality of points (two points in FIG. 3). These contact portions are designated by Tb, Tb.

To operate the traction drive power transmission device 10, the driving roller 12b is rotated by a rotary driving means (not shown). The rotational force is transmitted from the driving roller 12b to the shaft 11 by frictional force generated at the contact portions Tb, Tb between the driving roller 12b and the shaft 11, whereby the shaft 11 moves in the axial direction. For this, it is required to apply lubricant such as grease or oil onto the periphery of the shaft 11. By the lubricant, lubricant films are formed at the contact portions Ta, Tb, Tb of the shaft 11 with the driven roller 12a and the driving roller 12b. Driving force is transmitted from the driving roller 12b to the shaft 11 via the lubricant film.

Figure 4:
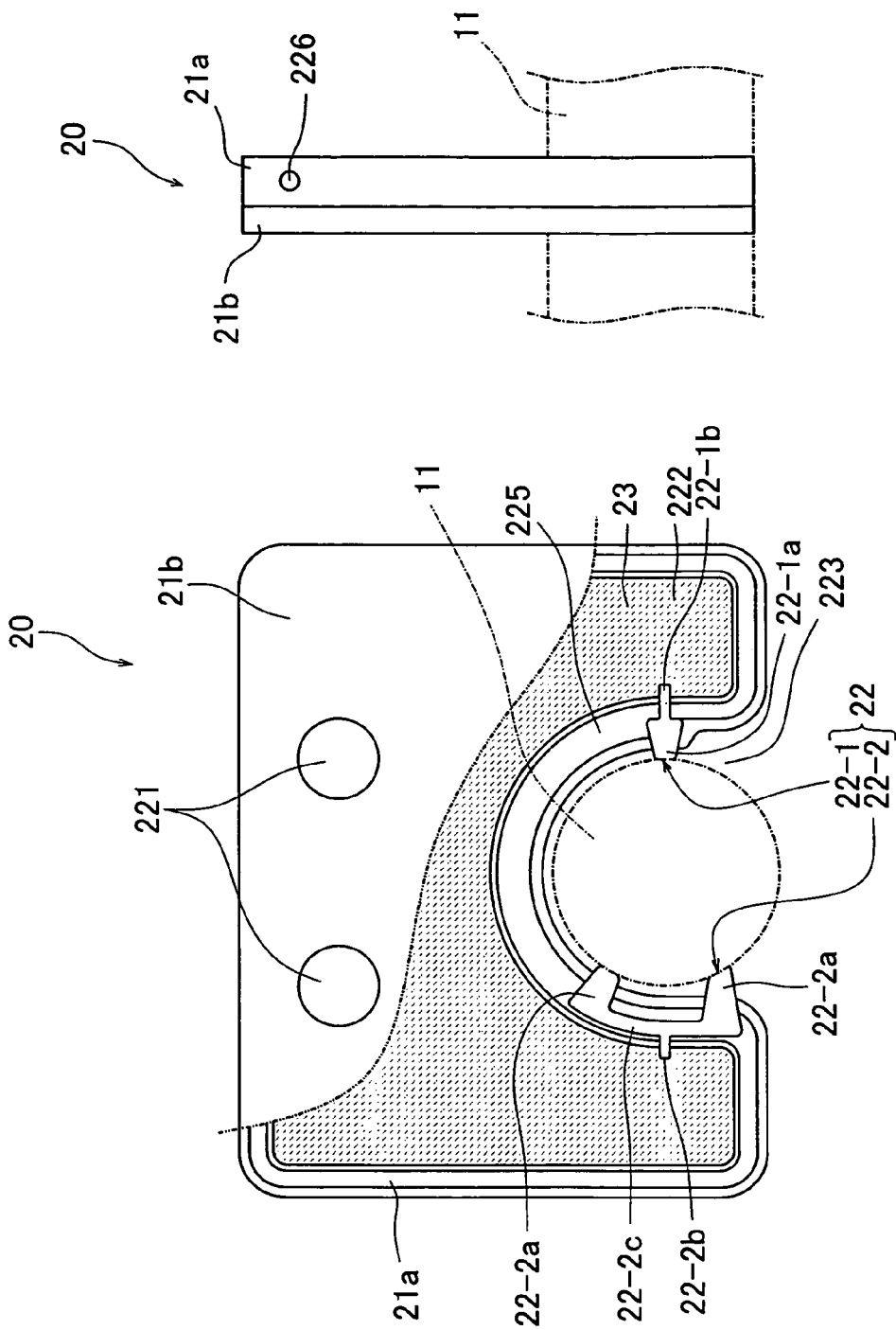
Figure 5:
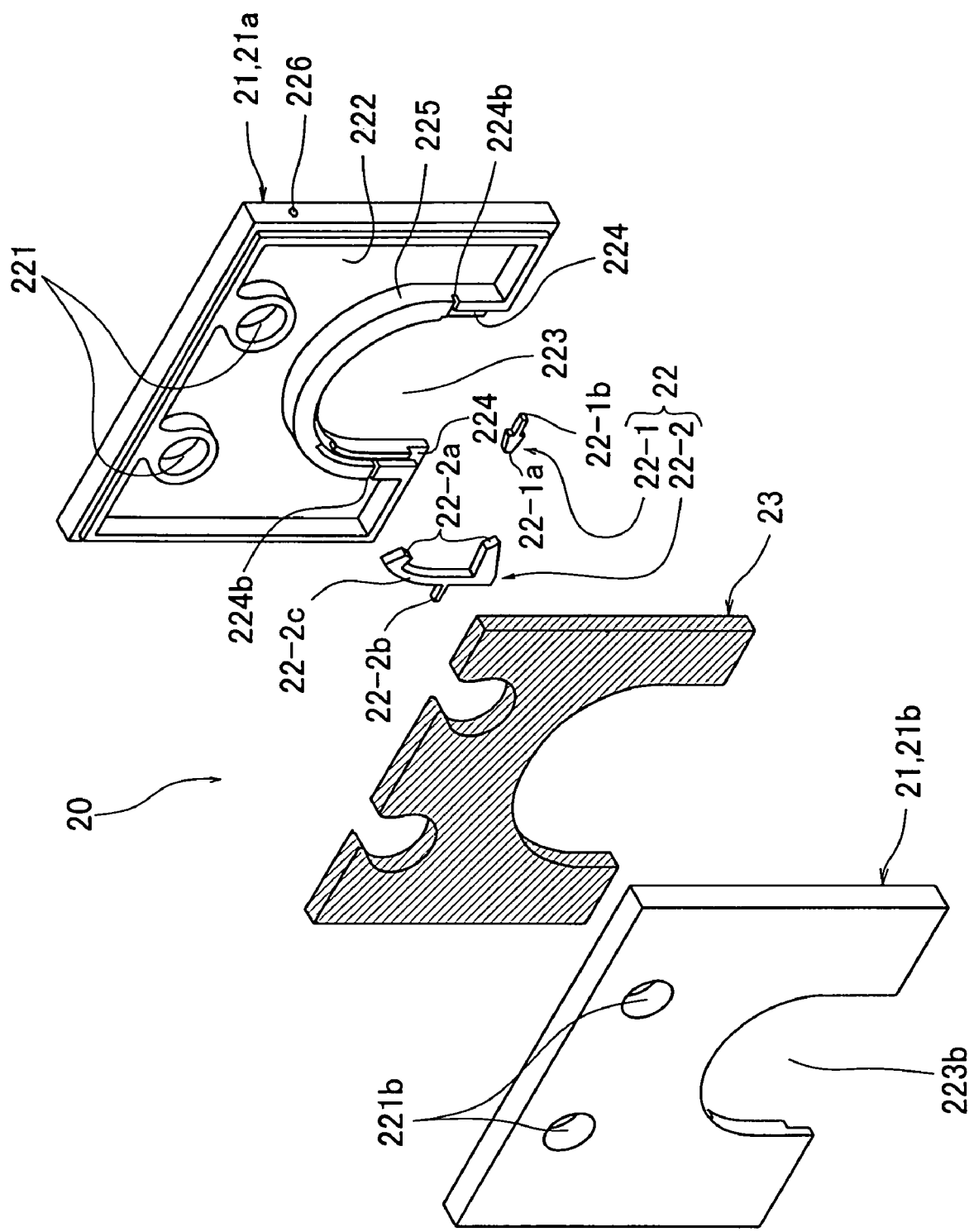
FIG. 5 is an exploded perspective view of a lubricator 20.

FIGS. 4A, 4B, and 5 are illustrations showing the lubricator 20, wherein FIG. 4A is a front view of the lubricator 20, FIG. 4B is a side view thereof, and FIG. 5 is an exploded perspective view thereof. The lubricator 20 comprises a casing 21, applicators 22-1, 22-2, and a reservoir 23. The casing 21 comprises a casing body 21a, which functions as a storage space for accommodating the applicators 22 and the reservoir 23 and is provided with groove portions 224 and a reservoir accommodating chamber 222, and a lid member 21b for closing the reservoir accommodating chamber 222 of the casing body 21a.

The casing body 21a is made of a synthetic resin or the like and is formed in a substantially rectangular plate-like configuration. The casing body 21a is provided with through holes 221, 221 formed in an upper portion (as seen from the front) thereof for the insertion of the screws 16, 16. The casing body 21a is also provided with a concave portion 223 formed in a lower portion thereof for allowing the attachment and detachment of the shaft 11 in a direction perpendicular to the axial direction of the shaft 11. The inner face of the concave portion 223 is formed into a configuration along the periphery of the shaft 11, that is, into a semicircle. The lower end of the concave portion 223 is structured to open substantially the same size as the diameter of the shaft 11 so as to allow the shaft 11 to be attached to and detached from the concave portion 223 at the lower side thereof.

The reservoir accommodating chamber 222 for accommodating the reservoir 23 is formed in the front face of the casing body 21a. The reservoir accommodating chamber 222 is formed in a portion other than the aforementioned through holes 221, 221 and the concave portion 223 to have such a depth as to accommodate the reservoir 23 as will be described later. A frame 225 is formed around the outer periphery of the concave portion 223 and is provided with groove portions 224 formed therein for accommodating the applicators 22-1, 22-2 as will be described later. The groove portions 224 are formed to have the same configurations as the configurations of the applicators 22-1, 22-2. The groove portions 224 are structured to open to the concave portion 223 such that the ends of applying portions 22-1a, 22-2a of the applicators 22-1, 22-2 project from the inner periphery of the concave portion 223. In addition, the frame 225 is provided with grooves 224b formed therein to communicate the aforementioned groove 224 with the reservoir accommodating chamber 222 such that lubricant sucking portions 22-1b, 22-2b of the applicators 22 project into the reservoir accommodating chamber 222. The casing body 21a is also provided with an air hole 226 which is formed in a side face thereof to extend from the reservoir accommodating chamber 222 to the outside for taking air into the reservoir accommodating chamber 222.

The lid member 21b is made of the same material as that of the casing body 21a and has substantially the same configuration as that of the casing body 21a as seen from the front in order to cover the reservoir accommodating chamber 222 and the groove portions 224 when fitted to the casing body 21a from the front side. That is, the lid member 21b is rectangular, is provided at its upper portion with through holes 221b, 221b of the same configuration as the through holes 221, 221, and is provided at its lower portion with a concave portion 223b of the same configuration as the concave portion 223.

Material suitable for the applicators 22 is such a material as to easily allow movement of the lubricant by capillary phenomenon such that the applicators 22 can smoothly apply the lubricant contained therein to the shaft 11, for example, fiber interlaced material such as felt having a low porosity. The applicators 22 comprise a driven-side applicator 22-1 to be in contact with the contact portion Ta of the shaft 11 with the driven roller 12a and a driving-side applicator 22-2 to be in contact with the contact portions Tb, Tb of the shaft 11 with the driving roller 12b.

The driven-side applicator 22-1 has a substantially rod-like configuration and is provided at its one end side with an applying portion 22-1a and is provided at its other end side with a lubricant sucking portion 22-1b, wherein the applying portion 22-1a and the lubricant sucking portion 22-1b are integrally formed. The driving-side applicator 22-2 comprises a rod-like body portion 22-2c, applying portions 22-2a projecting from the both ends of the body portion 22-2c in directions substantially perpendicular to the body portion 22-2c, and a lubricant sucking portion 22-2b projecting from the body portion 22-2c in a direction opposite to the applying portions 22-2a, wherein the body portion 22-2c, the applying portions 22-2a, and the lubricant sucking portion 22-2b are integrally formed. The positions where the applying portions 22-1a and 22-2a project correspond to the contact portions Ta, Tb, Tb of the shaft 11 with the driven roller 12a and the driving roller 12b. The ends of the applying portion 22-1a and the applying portions 22-2a are each formed to have a configuration corresponding to the outer periphery of the shaft 11, that is, a configuration forming a part of the circumference. According to the structure, the lubricant is applied only to the contact portions of the shaft 11 with the rollers 12 and is prevented from being applied extra to other portions. On the other hand, the lubricant sucking portions 22-1b, 22-2b are each structured to have such a length as to extend through the groove 224b extending from the groove portion 224 to the reservoir accommodating chamber 222 and project into the reservoir accommodating chamber 222.

The reservoir 23 is structured to have substantially the same configuration as that of the inside of the reservoir accommodating chamber 222 so that the reservoir 23 is accommodated in the reservoir accommodating chamber 222 of the casing body 21a with no space between them. Material suitable for the reservoir 23 is fiber interlaced material such as felt having a high porosity so as to absorb and hold a large amount of lubricant. This reduces the frequency of resupplying lubricant to the reservoir 23. Only by replacing the reservoir 23, lubricant suitable for intended purpose of the device can be adopted.

Lubricant to be used at the contact portions of the shaft 11 with the rollers 12 in the traction drive power transmission device 10 must be lubricant having a high traction coefficient. This is because the viscosity of oil film on the rolling contact faces is required to be increased as the contact pressure is increased, that is, the lubricant is required to be instantaneously solidified to be vitreous under a high pressure and to be quickly returned to have its original fluidity when coming off from the contact face. Lubricant to be suitably used for the traction drive power transmission drive is lubricant having not only high traction coefficient but also high lubrication property and is capable of forming thick oil film on the rolling contact faces to reduce wear caused due to direct contact between metals, thereby elongating the life time. Such suitable lubricant has characteristics, for example, traction coefficient=0.093, flash point=178° C., kinematic viscosity (40° C.)=107.3 mm$^2$/s, viscosity index=−9, total acid value=1.08 mgKOH/g, pour point=−25° C., decreasing rate in acoustic shear kinematic viscosity (40° C., 10 kHz, 30 min)=0.2, and density (15° C.)=0.917 g/cm$^3$.

To assemble the traction drive power transmission device 10 having the aforementioned lubricator 20, first the reservoir 23 is accommodated into the reservoir accommodating chamber 222 of the casing body 21a. The applicator 22-1 and the applicator 22-2 are accommodated into the groove portions 224 of the casing body 21a. Then, the lubricant is absorbed by the reservoir 23. The lid member 21b is fitted to the casing body 21a from the front side of the casing body 21a, thereby completing the lubricator 20. The lubricator 20 is mounted over the shaft 11 as shown in FIG. 2 such that the shaft 11 is positioned in the concave portion 223.

In the state that the shaft 11 is positioned in the concave portion 223, the back of the lubricator 20 is brought in contact with the end face 15a—where the shaft 11 penetrates—of the housing box 15 and the screws 16, 16 are passed through the through holes 221, 221 of the lubricator 20 and are inserted into fixing holes 15b, 15b formed in the housing box 15, thereby fixing the lubricator 20 to the housing box 15. Since the lubricator 20 is attached to the end face 15a—where the shaft 11 penetrates—of the housing box 15 of the traction drive power transmission device 10 so that the lubricator 20 is fixed in a state that the shaft 11 is positioned in the concave portion 223, the ends of the applying portions 22-1a, 22-2a projecting from the inner periphery of the concave portion 223 are in contact with the contact portions Ta, Tb, Tb of the shaft 11 with the driven roller 12 and the driving roller 15b.

Description will now be made as regard to the operation of the traction drive power transmission device 10 to which the lubricator 20 is attached. As the driving roller 12b is rotated by a rotary driving means (not shown), the rotational force is transmitted to the shaft 11 so that the shaft 11 moves along the axial direction thereof. As the shaft 11 moves in the axial direction, lubricant filled in the ends of the applying portions 22-1a, 22-2a is applied along extension lines in the axial direction of the contact portions Ta, Tb, Tb of the shaft 11 with the rollers 12.

As the lubricant filled in the ends of the applying portions 22-1a and 22-2a is reduced, lubricant contained in the applicators 22-1 and 22-2 moves to the ends of the applying portions 22-1a and 22-2a by capillary phenomenon and lubricant is supplied from the reservoir 23 to the applicators 22-1, 22-2. It should be noted that the lubricant filled in the ends of the applying portions 22-1a and 22-2a is prevented from dripping down because the lubricant is held by surface tension.

Because of the aforementioned actions, it is possible to successively apply lubricant to the shaft 11 in such an amount as to lubricate only the contact portions of the shaft 11 with the rollers 12 during the operation of the traction drive power transmission device 10. Therefore, there is no possibility of lack of lubricant at the contact portions Ta, Tb, Tb of the shaft 11 with the rollers 12, while there is also no possibility of application of too much lubricant, thereby preventing the lubricant from dripping so as to worse working conditions by soiling a floor and the like. Since the lubricant is applied to the contact portions successionally as the shaft 11 moves in the axial direction, it hardly runs out of lubricant, thereby enabling lubrication over an extended time period.

Since the casing 21 is provided with an air hole 22b formed in the side thereof, the pressure inside the reservoir accommodating chamber 222 is always kept at atmospheric pressure even when the lubricant is applied so that the lubricant moves from the reservoir 23 to the applicators 22. Therefore, the movement of the lubricant from the reservoir 23 to the applicators 22 mainly depends on the capillary phenomenon inside the fiber interlaced material.

For resupplying the lubricant to the reservoir 23 or replacing the lubricator 20, the lubricator 20 can be easily removed by removing the screws 16 and pulling up the lubricator 20. Therefore, the operation for resupplying the lubricant to the reservoir 23 or replacing the lubricator 20 is easy. Resupply of the lubricant is conducted by removing the lid member 21b of the casing 21 and then pouring the lubricant to the reservoir 23. For changing the kind of lubricant, the reservoir 23 is replaced with another one.

Figure 6:
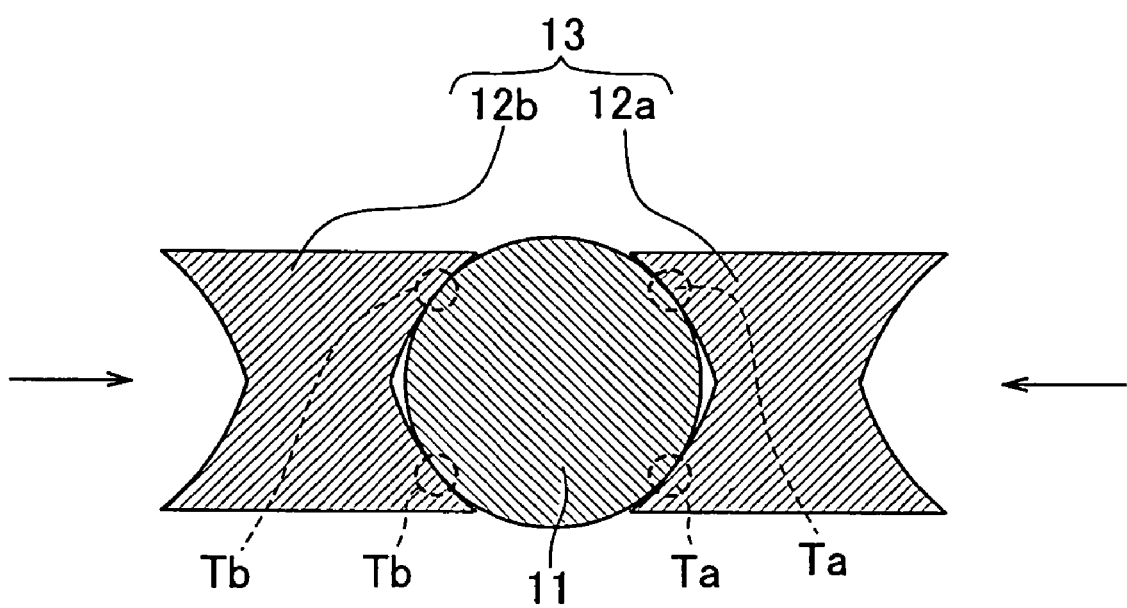
FIG. 6 is a sectional view in case of four contact points, corresponding to the sectional view taken along the line A-A of FIG. 2.

As mentioned above, the number of contact portions of the shaft 11 with the rollers 12 is at least three. Within this range, the configurations of and the contact states with the shaft of the driven roller 12a and the driving roller 12b are not limited to illustrated ones shown in FIG. 3. FIG. 6 is a sectional view corresponding to the sectional view taken along the line A-A of FIG. 2 showing the contact state in case that a driven roller 12a and a driving roller 12b of a driving section 13 are in contact with the shaft 11 at four points. In this case, the periphery of the driven roller 12a is formed in a gothic arc shape composed of two arcs so that the driven roller 12a is in contact with the shaft 11 at respective middle points of the arcs. These contact portions are designated by Ta, Ta. The periphery of the driving roller 12b is also formed in a gothic arc shape composed of two arcs so that the driving roller 12b is in contact with the shaft 11 at two points. These contact portions are designated by Tb, Tb.

Figure 7:
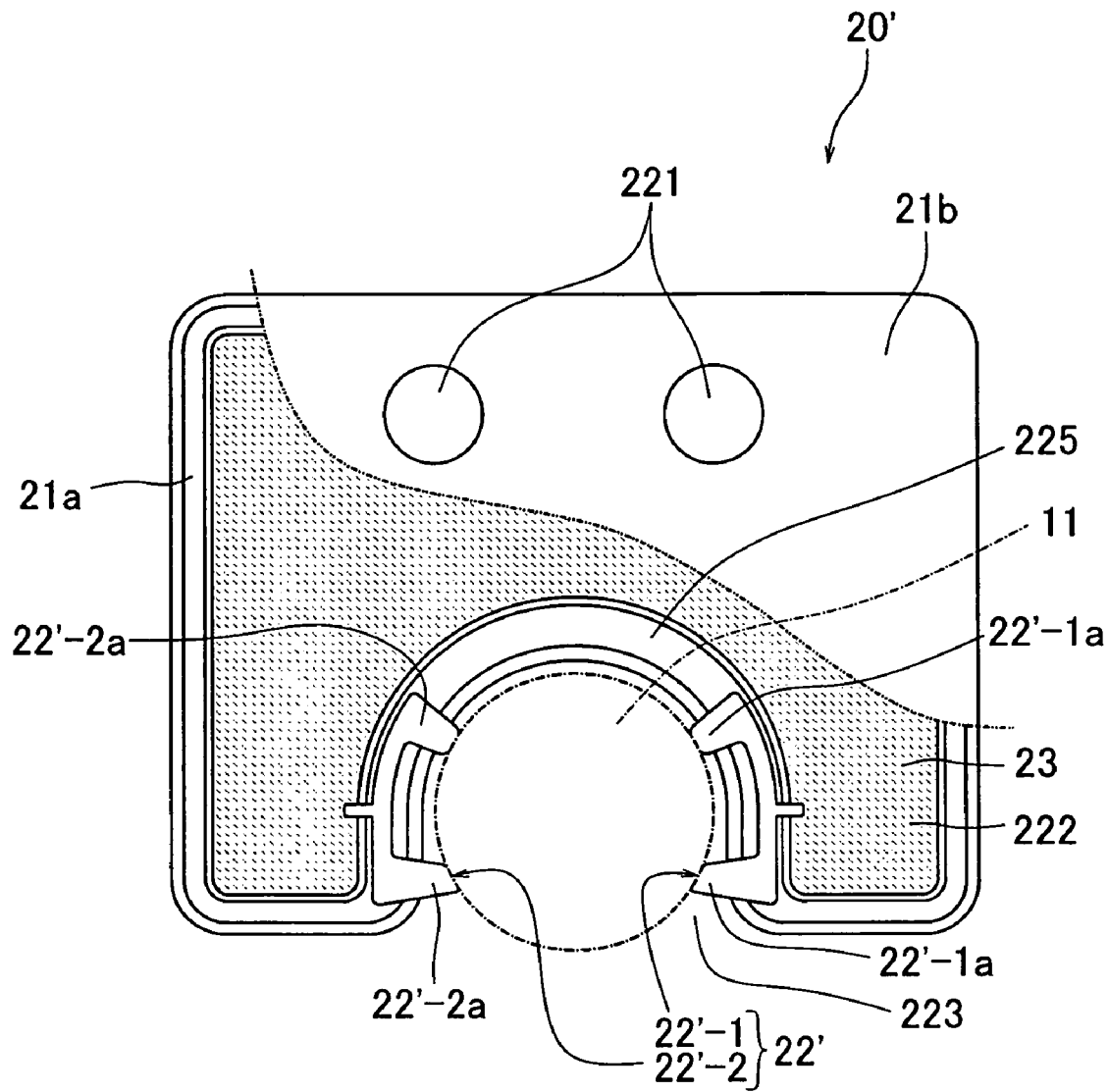
FIG. 7 is an illustration showing a lubricator 20'.

FIG. 7 shows a lubricator 20' to be used in a traction drive power transmission device 10 of the aforementioned four-point contact type. Parts of the lubricator 20' designated with the same numerals as the lubricator 20 are corresponding parts so that description about these parts will be omitted. The different point of the lubricator 20' from the lubricator 20 is the configuration of applicators 22'. That is, the driven-side applicator 22'-1 and the driving-side applicator 22'-2 are each in contact with the shaft 11 at two points so that the applying portions 22'-1a are in contact with the shaft at the contact portions Ta, Ta, respectively and the applying portions 22'-2a are in contact with the shaft at the contact portions Tb, Tb, respectively.

Though the embodiments of the present invention are described in the above, the present invention is not limited to the aforementioned embodiments and various modifications may be made without departing from the scope in technical idea as defined in the appended claims, the specification, and the drawings. It should be noted that configurations, structures, materials exhibiting the same functions and effects even not described directly in the specification and the drawings may be contained in the scope in technical idea of the present invention.

For example, though only one lubricator is provided for the traction drive power transmission device in the aforementioned embodiment, two or more lubricator may be provided. The applicators are not limited to have the aforementioned configurations and may have any configurations which can apply lubricant only to the contact portions.

INDUSTRIAL APPLICABILITY

The present invention provides a traction drive power transmission device in which lubricant can be applied only to contact portions of a shaft with rollers so as not to waste the lubricant, there is no possibility of application of too much lubricant, thereby preventing the lubricant from dripping and worsening working conditions by soiling a floor and the like.

The present invention further provides a traction drive power transmission device in which lubricant can be stably applied to contact portions of a shaft with rollers over an extended time period.

Furthermore, the present invention provides a traction drive power transmission device comprising a lubricator in which applicators are easily positioned relative to the shaft.

In addition, the present invention provides a traction drive power transmission device comprising a lubricator which can be easily attached and detached.

We claim:

1. A traction drive power transmission device comprising:
   at least one driving roller;
   a driven roller;
   a cylindrical shaft, wherein the shaft is held between the driving roller and the driven roller and rotational force of the driving roller is transmitted to the shaft by rotating the driving roller so as to move the shaft in an axial direction, and wherein a section, perpendicular to the axial direction of the shaft, of a face of said driving roller facing said shaft is in a shape of a line composed of a plurality of arcs, said driving roller being in contact with the surface of said shaft at a midpoint of each of said arcs, and a section, perpendicular to the axial direction of the shaft, of a face of said driven roller facing said shaft is in a shape of a line composed of a single arc; and
   a lubricator having applicators which apply lubricant only to portions of the shaft that are contacted by the driving roller and the driven roller,
   wherein said lubricator has an opening which is formed in a side of said lubricator to open both in the axial direction of said shaft and in a direction perpendicular to said axial direction, and said opening has such a width in the direction perpendicular to said axial direction as to enable said shaft to be inserted into and removed from said opening in the direction perpendicular to said axial direction without being interfered.

2. A traction drive power transmission device as claimed in claim 1, wherein said lubricator comprises
   a reservoir which absorbs and stores lubricant and supplies the lubricant to said applicators; and
   a casing which accommodates the applicators and the reservoir.

3. A traction drive power transmission device as claimed in claim 2, wherein
   said casing comprises a concave portion which allows said casing to be attached to and detached from said shaft in a direction perpendicular to the axial direction of said shaft and said applicators are disposed such that ends of the applicators project from a face, opposed to the shaft, of the concave portion.

4. A traction drive power transmission device as claimed in claim 3, further comprising:

a housing box, wherein said driving roller and said driven roller are accommodated in the housing box, said shaft penetrates and extends from both ends of the housing box, said casing of the lubricator is attached to an end face of the housing box where the shaft penetrates.

* * * * *